(12) United States Patent
Lee et al.

(10) Patent No.: US 10,329,405 B2
(45) Date of Patent: *Jun. 25, 2019

(54) MODIFIED POLYMER COMPOSITION AND STABILIZER MIXTURE FOR MAKING THE SAME

(71) Applicant: FDC, Lees Co., Ltd., Taipei (TW)

(72) Inventors: Kun-Chang Lee, Taipei (TW); Chen-Kai Chen, Taipei (TW); Jen-Fu Wang, Taipei (TW)

(73) Assignee: FDC, Lees Co., Ltd., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,035

(22) Filed: Sep. 19, 2017

(65) Prior Publication Data

US 2018/0002511 A1 Jan. 4, 2018

Related U.S. Application Data

(63) Continuation-in-part of application No. 15/417,719, filed on Jan. 27, 2017.

(30) Foreign Application Priority Data

Feb. 4, 2016 (TW) .............................. 105103696 A
Aug. 19, 2016 (TW) .............................. 105126497 A

(51) Int. Cl.
| | |
|---|---|
| *C08K 5/524* | (2006.01) |
| *C08K 5/372* | (2006.01) |
| *C08K 5/527* | (2006.01) |
| *C08K 5/5393* | (2006.01) |
| *C09K 15/32* | (2006.01) |
| *C08K 5/526* | (2006.01) |
| *C08K 5/5313* | (2006.01) |

(52) U.S. Cl.
CPC .............. *C08K 5/524* (2013.01); *C08K 5/372* (2013.01); *C08K 5/526* (2013.01); *C08K 5/527* (2013.01); *C08K 5/5313* (2013.01); *C08K 5/5393* (2013.01); *C09K 15/322* (2013.01); *C09K 15/324* (2013.01)

(58) Field of Classification Search
CPC ........ C08K 5/524; C08K 5/373; C08K 5/527; C08K 5/5393; C08K 5/526; C08K 5/5313; C08K 15/322; C08K 15/324
See application file for complete search history.

(56) References Cited

U.S. PATENT DOCUMENTS

| | | | | |
|---|---|---|---|---|
| 3,565,855 A | * | 2/1971 | Meltsner et al. ........ | C08K 5/51 252/404 |
| 3,741,909 A | * | 6/1973 | Yamane et al. ........ | C08K 5/372 252/400.52 |
| 4,443,572 A | * | 4/1984 | Burns .................... | C07F 9/025 252/400.24 |
| 2002/0013462 A1 | * | 1/2002 | Gupta .................. | C07D 251/24 544/215 |
| 2010/0107508 A1 | * | 5/2010 | Liu .......................... | A46D 1/00 51/298 |
| 2010/0187726 A1 | * | 7/2010 | Gibbons ............... | B29C 41/003 264/310 |
| 2013/0217606 A1 | * | 8/2013 | Wang .................. | C10M 129/60 508/449 |
| 2017/0226324 A1 | * | 8/2017 | Lee ...................... | C08K 5/5393 |
| 2018/0002511 A1 | | 1/2018 | Lee | |

FOREIGN PATENT DOCUMENTS

| | | | |
|---|---|---|---|
| CN | 101003643 | | 7/2007 |
| CN | 101003643 A | * | 7/2007 |

* cited by examiner

*Primary Examiner* — Peter D. Mulcahy
(74) *Attorney, Agent, or Firm* — Cesari and McKenna, LLP

(57) ABSTRACT

Disclosed herein is a stabilizer mixture for modifying an olefin-based polymer, which comprises at least one organic phosphorus-containing antioxidant represented by a formula selected from the group consisting of formulae (1), (2), (3), (4), (5), (6), (7), and (8), as well as at least one sulfur-containing carboxylate salt represented by a formula selected from the group consisting of formulae (9), (10), (11), and (12). Also disclosed herein is a modified polymer composition prepared from an olefin-based polymer using the stabilizer mixture. The olefin-based polymer is selected from the group consisting of polyolefin, ethylene-vinyl acetate copolymer, and a combination thereof.

19 Claims, No Drawings

MODIFIED POLYMER COMPOSITION AND STABILIZER MIXTURE FOR MAKING THE SAME

CROSS-REFERENCE TO RELATED APPLICATION

This application is a continuation-in-part application of U.S. patent application Ser. No. 15/417,719 filed on Jan. 27, 2017, which claims priority of Taiwanese Patent Application Nos. 105126497 and 105103696, respectively filed on Aug. 19, 2016 and Feb. 4, 2016. The entire content of each of the U.S. and Taiwanese patent applications is incorporated herein by reference.

FIELD

The disclosure relates to a modified polymer composition, and more particularly to a modified polymer composition prepared from an olefin-based polymer using a stabilizer mixture which contains at least one organic phosphorus-containing antioxidant and at least one sulfur-containing carboxylate salt.

BACKGROUND

Olefin-based polymers, such as polyolefins and ethylene-vinyl acetate copolymers, are widely used for making various products, because they have good chemical stability, mechanical strength, electrical insulating ability, and dimensional stability and they are non-toxic and easily processable. However, olefin-based polymers have defects, such as susceptibility to discoloration (for example, yellowing) and reduced mechanical properties, due to oxidative degradation caused by heat, light, and oxygen.

It is well-known that an antioxidant may be used in a process for manufacturing a molding product from an olefin-based polymer to prevent the olefin-based polymer from oxidative degradation so as to enhance the mechanical property and thermal resistance of the olefin-based polymer. However, use of antioxidants might result in coloration and reduced processing stability of olefin-based polymers. In addition, an anti-acid agent may be used in a process for manufacturing a molding product from an olefin-based polymer to inhibit the degradation of the olefin-based polymer by an acidic substance. Nevertheless, anti-acid agents might result in coloration and reduced processing stability of olefin-based polymers.

SUMMARY

According to a first aspect of the disclosure, there is provided a stabilizer mixture for modifying an olefin-based polymer, which comprises:
  at least one organic phosphorus-containing antioxidant represented by a formula selected from the group consisting of formulae (1), (2), (3), (4), (5), (6), (7), and (8),

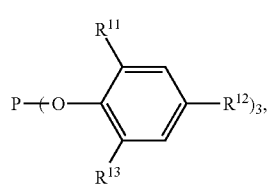

(1)

wherein $R^{11}$, $R^{12}$, and $R^{13}$ are independently selected from the group consisting of hydrogen, a tert-butyl group, an isopropylphenyl group, and a linear $C_1$-$C_8$ alkyl group,

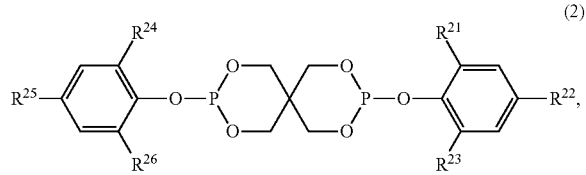

(2)

wherein $R^{21}$, $R^{22}$, $R^{23}$, $R^{24}$, $R^{25}$, and $R^{26}$ are independently selected from the group consisting of hydrogen, a tert-butyl group, an isopropylphenyl group, and a linear $C_1$-$C_8$ alkyl group,

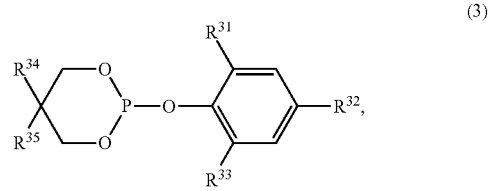

(3)

wherein $R^{31}$, $R^{32}$, $R^{33}$, $R^{34}$, and $R^{35}$ are independently selected from the group consisting of hydrogen, a tert-butyl group, an isopropylphenyl group, and a linear $C_1$-$C_8$ alkyl group,

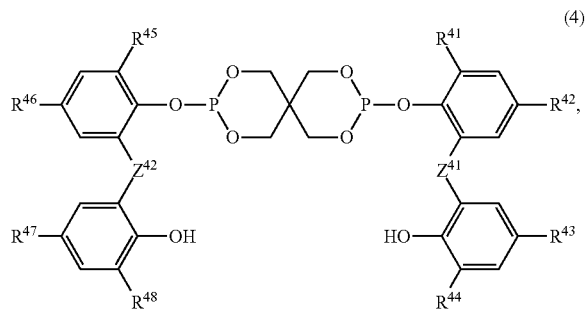

(4)

wherein
$R^{41}$, $R^{42}$, $R^{43}$, $R^{44}$, $R^{45}$, $R^{46}$, $R^{47}$, and $R^{48}$ are independently selected from the group consisting of hydrogen, a tert-butyl group, an isopropylphenyl group, and a linear $C_1$-$C_8$ alkyl group, and
$Z^{41}$ and $Z^{42}$ are independently selected from the group consisting of O, S, and a $C_1$-$C_4$ alkylene group,

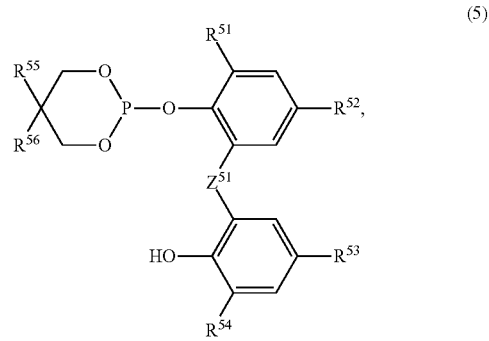

(5)

wherein $R^{51}$, $R^{52}$, $R^{53}$, $R^{54}$, $R^{55}$, and $R^{56}$ are independently selected from the group consisting of hydrogen, a tert-butyl group, an isopropylphenyl group, and a linear $C_1$-$C_8$ alkyl group, and $Z^{51}$ is selected from the group consisting of O, S, and a $C_1$-$C_4$ alkylene group,

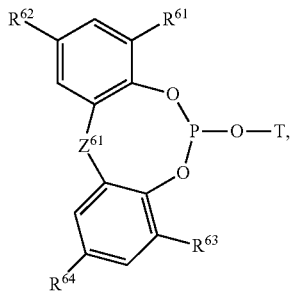

(6)

wherein $R^{61}$, $R^6$, $R^{63}$, and $R^{64}$ are independently selected from the group consisting of hydrogen, a tert-butyl group, an isopropylphenyl group, and a linear $C_1$-$C_8$ alkyl group, T is selected from the group consisting of a $C_1$-$C_{18}$ hydrocarbon group and a group represented by

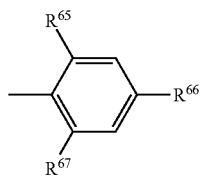

where $R^{65}$, $R^{66}$, and $R^{67}$ are independently selected from the group consisting of hydrogen, a tert-butyl group, an isopropylphenyl group, and a linear $C_1$-$C_8$ alkyl group, and $Z^{61}$ is selected from the group consisting of O, S, and a $C_1$-$C_4$ alkylene group,

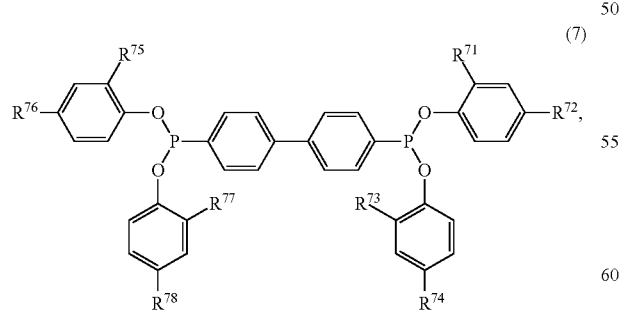

(7)

wherein $R^{71}$, $R^{72}$, $R^{73}$, $R^{74}$, $R^{75}$, $R^{76}$, $R^{77}$, and $R^{78}$ are independently selected from the group consisting of hydrogen, a tert-butyl group, an isopropylphenyl group, and a linear $C_1$-$C_8$ alkyl group, and

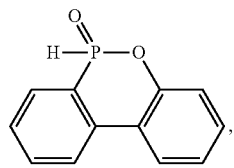

(8)

and at least one sulfur-containing carboxylate salt represented by a formula selected from the group consisting of formulae (9), (10), (11), and (12)

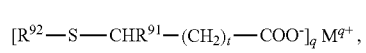

(9)

wherein $R^{91}$ is selected from the group consisting of hydrogen and a $C_1$-$C_{18}$ alkyl group, $R^{92}$ is selected from the group consisting of a $C_1$-$C_{30}$ alkyl group and a $C_6$-$C_{18}$ aryl group, $M^{q+}$ is selected from the group consisting of $Ca^{2+}$ $Ba^{2+}$, $Mg^{2+}$, $Zn^{2+}$, and $Al^{3+}$, q is an integer of 2 or 3, and t is an integer ranging from 0 to 6,

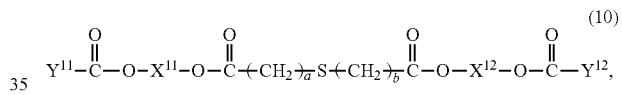

(10)

wherein $X^{11}$ and $X^{12}$ are independently selected from the group consisting of $Ca^{2+}$, $Ba^{2+}$, $Mg^{2+}$, and $Zn^{2+}$, $Y^{11}$ and $Y^{12}$ are independently selected from the group consisting of a $C_1$-$C_{30}$ alkyl group and a $C_6$-$C_{18}$ aryl group, and a and b are independently an integer ranging from 1 to 6,

(11)

wherein $X^{21}$ is selected from the group consisting of $Ca^{2+}$, $Ba^{2+}$, $Mg^{2+}$, and $Zn^{2+}$, $G^1$ and $G^2$ independently represent

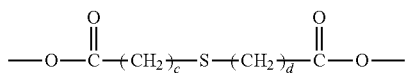

where c and d are independently an integer ranging from 1 to 6, and p is an integer ranging from 1 to 9 on the proviso that a plurality of $G^1$ are the same or different and a plurality of $X^{21}$ are the same or different when p is an integer equal to or larger than 2, and

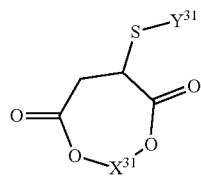
(12)

wherein
$X^{31}$ is selected from the group consisting of $Ca^{2+}$, $Ba^{2+}$, $Mg^{2+}$, and $Zn^{2+}$, and
$Y^{31}$ is selected from the group consisting of a $C_1$-$C_{30}$ alkyl group, a $C_6$-$C_{18}$ aryl group, and a group represented by $R^{93}OOC-(CH_2)_k-$ where $R^{93}$ is selected from the group consisting of a $C_1$-$C_{30}$ alkyl group and a $C_6$-$C_{18}$ aryl group, and k is an integer ranging from 1 to 5.

According to a second aspect of the disclosure, there is provided a modified polymer composition prepared from an olefin-based polymer using the aforesaid stabilizer mixture. The olefin-based polymer is selected from the group consisting of polyolefin, ethylene-vinyl acetate copolymer, and a combination thereof.

DETAILED DESCRIPTION

The present disclosure provides a stabilizer mixture for modifying an olefin-based polymer, which comprises at least one organic phosphorus-containing antioxidant and at least one sulfur-containing carboxylate salt.

According to the present disclosure, the at least one organic phosphorus-containing antioxidant is represented by a formula selected from the group consisting of formulae (1), (2), (3), (4), (5), (6), (7), and (8), which are shown below. In other words, the organic phosphorus-containing antioxidant in the stabilizer mixture may be selected from the group consisting of the organic phosphorus-containing antioxidant of formula (1), the organic phosphorus-containing antioxidant of formula (2), the organic phosphorus-containing antioxidant of formula (3), the organic phosphorus-containing antioxidant of formula (4), the organic phosphorus-containing antioxidant of formula (5), the organic phosphorus-containing antioxidant of formula (6), the organic phosphorus-containing antioxidant of formula (7), the organic phosphorus-containing antioxidant of formula (8), and combinations thereof.

The organic phosphorus-containing antioxidant represented by formula (1) is as follows:

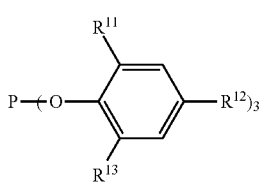
(1)

wherein $R^{11}$, $R^{12}$, and $R^{13}$ are independently selected from the group consisting of hydrogen, a tert-butyl group, an isopropylphenyl group, and a linear $C_1$-$C_8$ alkyl group.

The organic phosphorus-containing antioxidant represented by formula (2) is as follows:

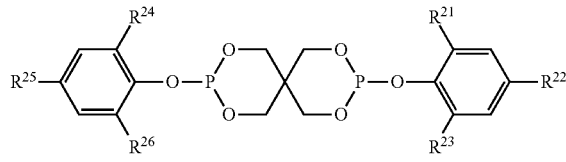
(2)

wherein $R^{21}$, $R^{22}$, $R^{23}$, $R^{24}$, $R^{25}$, and $R^{26}$ are independently selected from the group consisting of hydrogen, a tert-butyl group, an isopropylphenyl group, and a linear $C_1$-$C_8$ alkyl group.

The organic phosphorus-containing antioxidant represented by formula (3) is as follows:

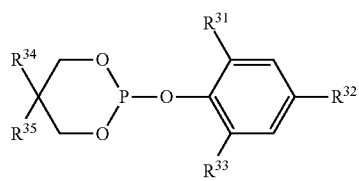
(3)

wherein $R^{31}$, $R^{32}$, $R^{33}$, $R^{34}$, and $R^{35}$ are independently selected from the group consisting of hydrogen, a tert-butyl group, an isopropylphenyl group, and a linear $C_1$-$C_8$ alkyl group.

The organic phosphorus-containing antioxidant represented by formula (4) is as follows:

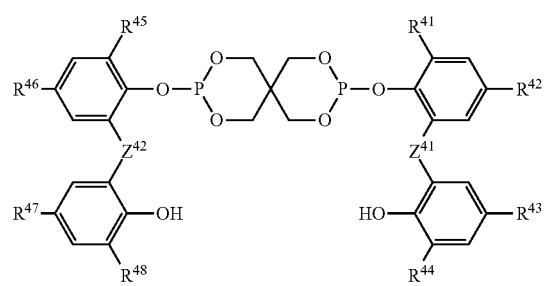
(4)

wherein $R^{41}$, $R^{42}$, $R^{43}$, $R^{44}$, $R^{45}$, $R^{46}$, $R^{47}$, and $R^{48}$ are independently selected from the group consisting of hydrogen, a tert-butyl group, an isopropylphenyl group, and a linear $C_1$-$C_8$ alkyl group, and $Z^{41}$ and $Z^{42}$ are independently selected from the group consisting of O, S, and a $C_1$-$C_4$ alkylene group.

The organic phosphorus-containing antioxidant represented by formula (5) is as follows:

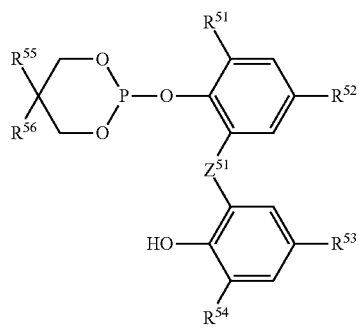
(5)

wherein $R^{51}$, $R^{52}$, $R^{53}$, $R^{54}$, $R^{55}$, and $R^{56}$ are independently selected from the group consisting of hydrogen, a tert-butyl group, an isopropylphenyl group, and a linear $C_1$-$C_8$ alkyl group, and $Z^{51}$ is selected from the group consisting of O, S, and a $C_1$-$C_4$ alkylene group.

The organic phosphorus-containing antioxidant represented by formula (6) is as follows:

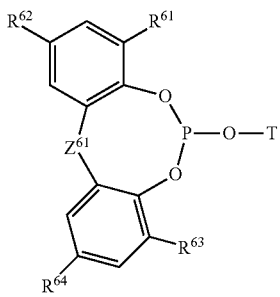

(6)

wherein $R^{61}$, $R^{62}$, $R^{63}$, and $R^{64}$ are independently selected from the group consisting of hydrogen, a tert-butyl group, an isopropylphenyl group, and a linear $C_1$-$C_8$ alkyl group, T is selected from the group consisting of a $C_1$-$C_{18}$ hydrocarbon group and a group represented by

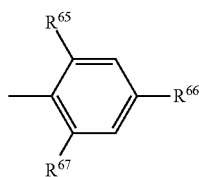

where $R^{65}$, $R^{66}$, and $R^{67}$ are independently selected from the group consisting of hydrogen, a tert-butyl group, an isopropylphenyl group, and a linear $C_1$-$C_8$ alkyl group, and $Z^{61}$ is selected from the group consisting of O, S, and a $C_1$-$C_4$ alkylene group.

The organic phosphorus-containing antioxidant represented by formula (7) is as follows:

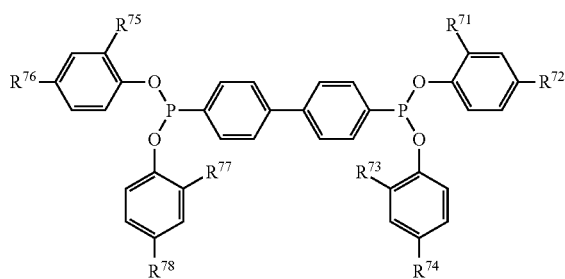

(7)

wherein $R^{71}$, $R^{72}$, $R^{73}$, $R^{74}$, $R^{75}$, $R^{76}$, $R^{77}$, and $R^{78}$ are independently selected from the group consisting of hydrogen, a tert-butyl group, an isopropylphenyl group, and a linear $C_1$-$C_8$ alkyl group.

The organic phosphorus-containing antioxidant represented by formula (8) is as follows:

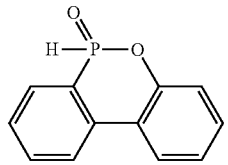

(8)

According to the present disclosure, the at least one sulfur-containing carboxylate salt is represented by a formula selected from the group consisting of formulae (9), (10), (11), and (12), which are shown below. In other words, the sulfur-containing carboxylate salt in the stabilizer mixture may be selected from the group consisting of the sulfur-containing carboxylate salt of formula (9), the sulfur-containing carboxylate salt of formula (10), the sulfur-containing carboxylate salt of formula (11), the sulfur-containing carboxylate salt of formula (12), and combinations thereof.

The sulfur-containing carboxylate salt represented by formula (9) is as follows:

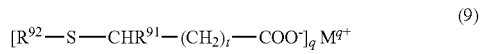

(9)

wherein $R^{91}$ is selected from the group consisting of hydrogen and a $C_1$-$C_{18}$ alkyl group; $R^{92}$ is selected from the group consisting of a $C_1$-$C_{30}$ alkyl group and a $C_6$-$C_{18}$ aryl group; $M^{q+}$ is selected from the group consisting of $Ca^{2+}$, $Ba^{2+}$, $Mg^{2+}$, $Zn^{2+}$, and $Al^{3+}$; q is an integer of 2 or 3; and t is an integer ranging from 0 to 6.

The sulfur-containing carboxylate salt represented by formula (10) is as follows:

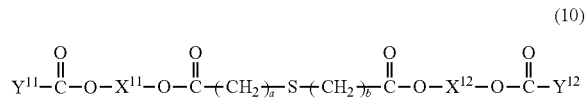

(10)

wherein $X^{11}$ and $X^{12}$ are independently selected from the group consisting of $Ca^{2+}$, $Ba^{2+}$, $Mg^{2+}$, and $Zn^{2+}$; $Y^{11}$ and $Y^{12}$ are independently selected from the group consisting of a $C_1$-$C_{30}$ alkyl group and a $C_6$-$C_{18}$ aryl group; and a and b are independently an integer ranging from 1 to 6.

The sulfur-containing carboxylate salt represented by formula (11) is as follows:

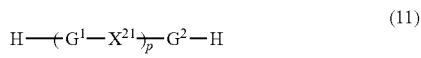

(11)

wherein $X^{21}$ is selected from the group consisting of $Ca^{2+}$, $Ba^{2+}$, $Mg^{2+}$, and $Zn^{2+}$; $G^1$ and $G^2$ independently represent

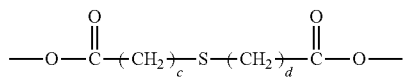

where c and d are independently an integer ranging from 1 to 6; and p is an integer ranging from 1 to 9 on the proviso that a plurality of $G^1$ are the same or different and a plurality of $X^{21}$ are the same or different when p is an integer equal to or larger than 2.

The sulfur-containing carboxylate salt represented by formula (12) is as follows:

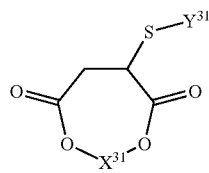

(12)

wherein $X^{31}$ is selected from the group consisting of $Ca^{2+}$, $Ba^{2+}$, $Mg^{2+}$, and $Zn^{2+}$; and $Y^{31}$ is selected from the group consisting of a $C_1$-$C_{30}$ alkyl group, a $C_6$-$C_{18}$ aryl group, and a group represented by $R^{93}OOC-(CH_2)_k-$ where $R^{93}$ is selected from the group consisting of a $C_1$-$C_{30}$ alkyl group and a $C_6$-$C_{18}$ aryl group, and k is an integer ranging from 1 to 5.

The present disclosure further provides a modified polymer composition which is prepared from an olefin-based polymer using the aforesaid stabilizer mixture.

More details of the olefin-based polymer and the stabilizer mixture according to the present disclosure are described below.

Olefin-Based Polymer:

The olefin-based polymer suitable for the disclosure is selected from the group consisting of polyolefins, ethylene-vinyl acetate copolymers, and combinations thereof.

Stabilizer Mixture:

Examples of the organic phosphorus-containing antioxidant represented by formula (1) include, but are not limited to, tris(2,4-di-tert-butylphenyl) phosphite (Antioxidant 168), triphenyl phosphite, tris(4-tert-butylphenyl) phosphite, tris (nonylphenyl) phosphite, and tris(p-cumylphenyl) phosphite.

Examples of the organic phosphorus-containing antioxidant represented by formula (2) include, but are not limited to, bis(2,4-di-tert-butylphenyl)pentaerythritol diphosphite (Antioxidant 626), 3,9-bis(2,4-cumylphenoxy)-2,4,8,10-tetraoxa-3,9-diphosphaspiro[5.5]undecane (Antioxidant 9228), diphenyl pentaerythritol diphosphite, and 2,4,8,10-tetraoxa-3,9-diphosphaspiro[5.5]undecane.

Examples of the organic phosphorus-containing antioxidant represented by formula (3) include, but are not limited to,

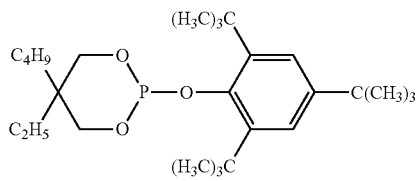

(CAS No. 161717-32-4),
2-[2,4-bis(1,1-dimethylethyl)phenoxy]-5,5-dimethyl-1,3,2-dioxaphosphorinane, 2,4-dicumylphenyl 2-butyl-2-ethyl-1, 3-propanediol phosphite, and 2-[2,4-bis(1,1-dimethylethyl) phenoxy]-5-butyl-5-ethyl-1,3,2-dioxaphosphorinane.

A non-limiting example of the organic phosphorus-containing antioxidant represented by formula (4) is

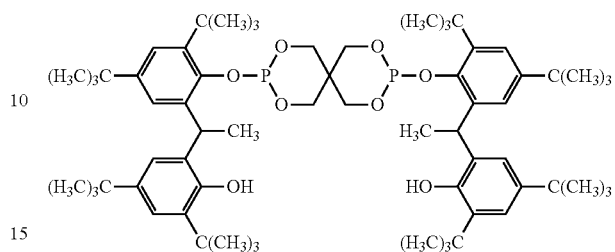

(CAS No. 1601458-04-1).

A non-limiting example of the organic phosphorus-containing antioxidant represented by formula (5) is

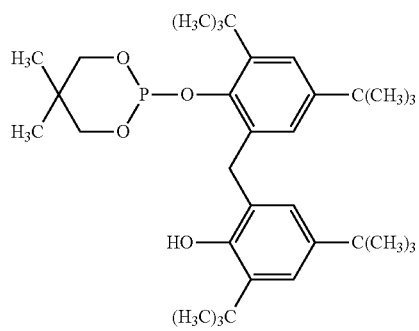 [SMILES: CC1(C)COP(Oc2c(Cc3cc(C(C)(C)C)cc(C(C)(C)C)c3O)cc(C(C)(C)C)cc2C(C)(C)C)OC1]

(CAS No. 205518-79-2).

Examples of the organic phosphorus-containing antioxidant represented by formula (6) include, but are not limited to, 2,4,8,10-tetra-tert-butyl-6-[(2-ethylhexyl)oxy]-12H-dibenzo[d,g][1,3,2]dioxaphosphocin (HP-10), 2,2'-thiobis [6-tert-butyl-p-cresol] cyclic monophenyl phosphite, and 2,2'-methylene bis(4,6-di-tert-butylphenyl) (2,4-di-tert-butylphenyl) phosphite.

Examples of the organic phosphorus-containing antioxidant represented by formula (7) include, but are not limited to, Antioxidant P-EPQ, phosphonous acid, [1,1'-biphenyl]-4,4'-diylbis-,tetrakis[2-(1,1-dimethylethyl)phenyl] ester, and phosphonous acid, [1,1'-biphenyl]-4,4'-diylbis-,tetraphenyl ester.

In certain embodiments, $R^{91}$ represents hydrogen, and $R^{92}$ is selected from the group consisting of a $C_1$-$C_{18}$ alkyl group and a $C_6$-$C_{18}$ aryl group. The term "aryl group" refers to a non-substituted aryl group, a hydrocarbon-substituted aryl group, or an aryl-substituted hydrocarbon group. In certain embodiments, $R^{92}$ is dodecyl. Examples of the sulfur-containing carboxylate salt represented by formula (9) include, but are not limited to, $(C_{12}H_{25}SCH_2COO)_2Zn$, $(C_{12}H_{25}SCH_2COO)_2Ca$, $(C_{12}H_{25}SCH_2CH_2COO)_2Zn$, $(C_{12}H_{25}SCH_2CH_2COO)_2Ca$, and $(C_{12}H_{25}SCH_2CH_2COO)_3Al$.

In certain embodiments, $X^{11}$ and $X^{12}$ are independently selected from the group consisting of $Ca^{2+}$ and $Zn^{2+}$, and $Y^{11}$ and $Y^{12}$ are independently selected from the group consisting of $-C_7H_{15}$ and $-C_{17}H_{35}$. Examples of the sulfur-containing carboxylate salt represented by formula (10) include, but are not limited to,

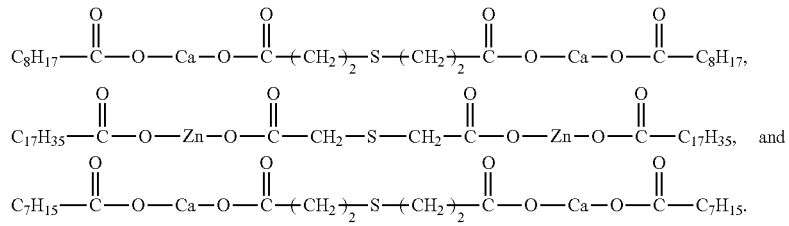

In certain embodiments, $X^{21}$ is selected from the group consisting of $Ca^{2+}$ and $Zn^{2+}$, and $G^1$ and $G^2$ are independently

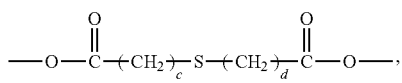

wherein c and d are independently 1 or 2. Examples of the sulfur-containing carboxylate salt represented by formula (11) include, but are not limited to,

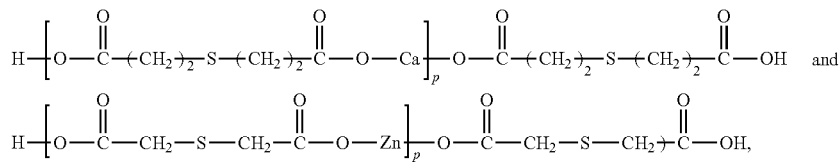

wherein p is an integer ranging from 1 to 9.

Examples of the sulfur-containing carboxylate salt represented by formula (12) include, but are not limited to,

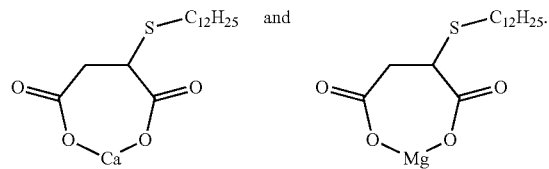

A ratio of the organic phosphorus-containing antioxidant to the sulfur-containing carboxylate salt ranges from 1:99 to 99:1.

According to the present disclosure, the stabilizer mixture may further comprise an antioxidant selected from the group consisting of a hindered phenolic antioxidant, a benzofuranone-based antioxidant, an amine oxide-based antioxidant, and combinations thereof.

Examples of the hindered phenolic antioxidant include, but are not limited to, pentaerythritol-tetra-[β-(3,5-di-tert-butyl-4-hydr-oxyphenyl)-propionate], ethylenebis(oxyethylene)bis[β-(3-tert-butyl-4-hydr-oxy-5-methylphenyl)propionate], 1,3,5-trimethyl-2,4,6-tris(3,5-di-tert-butyl-4-hydroxybenzyl)benze-ne, 1,3,5-tris(3,5-di-tert-butyl-4-hydroxybenzyl)isocyanurate, tris(butylcresol)butane, 4,4'-butylidenebis(6-tert-butyl-3-methylphenol), N,N'-bis[3-(3,5-di-tert-butyl-4-hydroxyphenyl)propionyl]hydrazide, N,N'-bis-[3-(3,5-di-tert-butyl-4-hydroxyphenyl)propionyl] hexamethylenediamine, 2,2'-methylenebis-(4-methyl-6-tert-butylphenol), octyl-3,5-di-tert-butyl-4-hydroxy-hydrocinnamate, 1,2-di[–(3,5-di-tert-butyl-4-hydroxyphenyl) propionyl]hydrazide, and 2,2'-oxamidobis[ethyl-3-(3,5-di-t-butyl-4-hydroxyphenyl)propionate]. A suitable hindered phenolic antioxidant may be used solely or in combination with other suitable hindered phenolic antioxidant(s).

Examples of the benzofuranone-based antioxidant include, but are not limited to, xylyl dibutylbenzofuranone, 5-(tert-butyl)-3-[5-(tert-butyl)-2-hydroxyphenyl]benzofuran-2(3H)-one (Chemical Abstracts Service (CAS) No. 214354-68-4), and 3-[3,5-bis(1,1-dimethylethyl)-2-hydroxyphenyl]-5,7-bis(1,1-dimethylethyl)-2(3H)-benzofuranone (CAS No. 210709-72-1). A suitable benzofuranone-based antioxidant may be used solely or in combination with other suitable benzofuranone-based antioxidant(s).

Examples of the amine oxide-based antioxidant include, but are not limited to, oxidized bis(hydrogenated tallow alkyl)amine and bis(octadecyl)hydroxylamine. A suitable amine oxide-based antioxidant may be used solely or in combination with other suitable amine oxide-based antioxidant(s).

According to the present disclosure, the stabilizer mixture may further comprise an additive selected from the group consisting of an antacid agent, a metal deactivating agent, and the combination thereof.

The antacid agent is able to balance the pH of the modified polymer composition and to render the antioxidant(s) and sulfur-containing carboxylate salt(s) employed more compatible, and may be a fatty acid salt. Exemplary fatty acid salts include, but are not limited to, calcium stearate, zinc stearate, magnesium docosanoate, magnesium stearate, sodium ricinoleate, and potassium palmitate. A suitable fatty acid salt may be used solely or in combination with other suitable fatty acid salt(s).

The metal deactivating agent is able to prevent the property of the modified polymer composition from deteriorating. Exemplary metal deactivating agents include, but are not limited to, oxalyl-bis(benzylidene)hydrazide. Suitable commercially available metal deactivating agents include, but are limited to, Eastman Inhibitor OABH.

In certain embodiments, the stabilizer mixture is present in an amount ranging from 0.01 to 2.2 parts by weight based on 100 parts by weight of the olefin-based polymer. There is no limitation to the method for preparing the modified polymer composition of the present disclosure. For example, the modified polymer composition may be preparing by mixing the olefin-based polymer with the stabilizer mixture.

There is no limitation to the subsequent processing method for the modified polymer composition. Any conventional processes for molding polyolefins and ethylene-vinyl acetate copolymers may be used. Examples of the molding processes include, but are not limited to, extrusion molding, injection molding, and the like.

Examples of the disclosure will be described hereinafter. It is to be understood that these examples are exemplary and explanatory and should not be construed as a limitation to the disclosure.

Reagents Used in Following Examples:
1. Polypropylene: B8001 commercially available from Formosa Chemicals & Fibre Corp., referred to as PP in Tables 1 and 2;
2. Polyethylene: LH608M commercially available from USI Corporation (Taiwan), referred to as PE in Tables 1 and 2;
3. Tris(2,4-di-tert-butylphenyl) phosphite (Antioxidant 168): an example of the organic phosphorus-containing antioxidant represented by formula (1), referred to as A1 in Tables 1 and 2;
4. Bis(2,4-di-tert-butylphenyl)pentaerythritol diphosphite (Antioxidant 626): an example of the organic phosphorus-containing antioxidant represented by formula (2), referred to as A2 in Tables 1 and 2;
5. 3,9-bis(2,4-cumylphenoxy)-2,4,8,10-tetraoxa-3,9-diphosphaspiro[5.5]undecane (Antioxidant 9228): an example of the organic phosphorus-containing antioxidant represented by formula (2), referred to as A3 in Tables 1 and 2;
6. 2,4,8,10-tetra-tert-butyl-6-[(2-ethylhexyl)oxy]-12H-dibenzo[d,g][1,3,2]dioxaphosphocin (HP-10): an example of the organic phosphorus-containing antioxidant represented by formula (6), referred to as A4 in Tables 1 and 2;
7. Antioxidant P-EPQ:

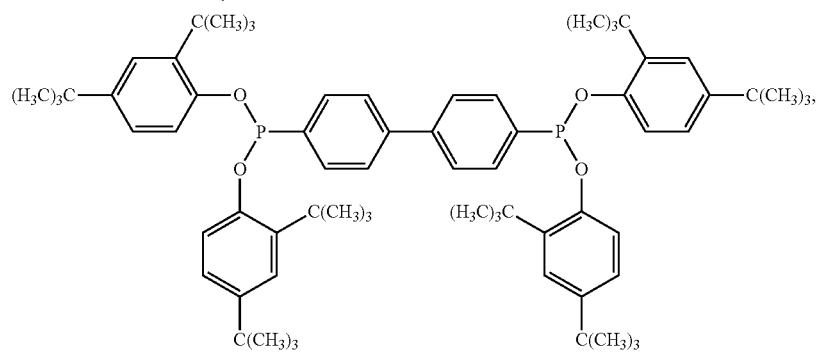

an example of the organic phosphorus-containing antioxidant represented by formula (7), referred to as A5 in Tables 1 and 2;
8. 9,10-dihydro-9-oxa-10-phosphaphenanthrene-10 oxide (DOPO): the organic phosphorus-containing antioxidant represented by formula (8), referred to as A6 in Tables 1 and 2;
9.

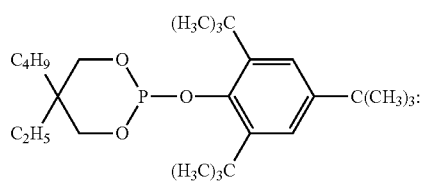

CAS No. 161717-32-4, an example of the organic phosphorus-containing antioxidant represented by formula (3), referred to as A7 in Tables 1 and 2;
10.

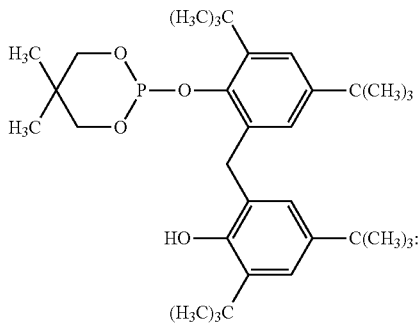

CAS No. 205518-79-2, an example of the organic phosphorus-containing antioxidant represented by formula (5), referred to as A8 in Tables 1 and 2;
11.

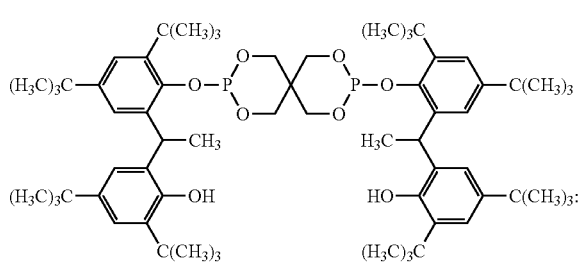

CAS No. 1601458-04-1, an example of the organic phosphorus-containing antioxidant represented by formula (4), referred to as A9 in Tables 1 and 2;

12. $(C_{12}H_{25}SCH_2CH_2COO)_2Ca$: an example of the sulfur-containing carboxylate salt represented by formula (9), referred to as B1 in Tables 1 and 2;

13. $(C_{12}H_{25}SCH_2CH_2COO)_3Al$: an example of the sulfur-containing carboxylate salt represented by formula (9), referred to as B2 in Tables 1 and 2;

14.

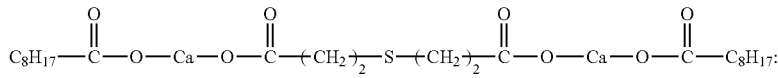

an example of the sulfur-containing carboxylate salt represented by formula (10), referred to as B3 in Tables 1 and 2;

15.

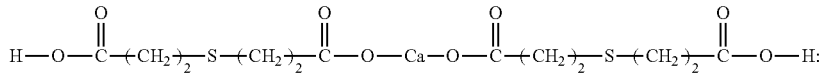

an example of the sulfur-containing carboxylate salt represented by formula (11), referred to as B4 in Tables 1 and 2;

16.

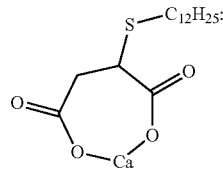

an example of the sulfur-containing carboxylate salt represented by formula (12), referred to as B5 in Tables 1 and 2; and 17. Distearyl thiodipropionate: referred to as DSTDP.

EXAMPLES 1-18

In each of Examples 1-16, 100 parts by weight of polypropylene was uniformly mixed with a stabilizer mixture in an amount shown in Table 1 at 25° C. to prepare a modified polymer composition of the present disclosure. In each of Examples 17 and 18, 100 parts by weight of polyethylene was uniformly mixed with a stabilizer mixture in an amount shown in Table 1 at 25° C. to prepare a modified polymer composition of the present disclosure.

Comparative Examples 1-21

In each of Comparative Examples 1-17 and 20-21, 100 parts by weight of polypropylene was uniformly mixed with a stabilizer(s) (i.e. an organic phosphorus-containing antioxidant alone, a sulfur-containing carboxylate ester alone, a sulfur-containing carboxylate salt alone, or a combination of an organic phosphorus-containing antioxidant and a sulfur-containing carboxylate ester) in an amount shown in Table 2 at 25° C. to prepare a modified polymer composition. In each of Comparative Examples 18 and 19, 100 parts by weight of polyethylene was uniformly mixed with a stabilizer (i.e. an organic phosphorus-containing antioxidant alone) in an amount shown in Table 2 at 25° C. to prepare a modified polymer composition.

Evaluation Tests:

Each of the modified polymer compositions prepared in Examples 1-18 and Comparative Examples 1-21 was extruded using a twin-screw extruder (Model No. PSM20A, produced by Sino-Alloy Machinery Inc.; temperature: 190-230° C., extruder screw speed: 200 rpm, feed rate: 6 rpm), followed by cooling, air-drying, pelletization, and oven drying. Therefore, a specimen was prepared. The specimen was further processed repeatedly by the steps of extrusion, cooling, air-drying, pelletization, and oven-drying to evaluate variations in yellowness and melt index after several times of processing. The smaller the variation in the yellowness of the specimen is, the better the color stability of the specimen is. Similarly, the smaller the variation in the melt index of the specimen is, the better the processing stability of the specimen is.

1. Yellowness Difference ($\Delta b^*$)

For the specimen of each of the modified polymer compositions prepared in Examples 1-18 and Comparative Examples 1-21, the yellowness difference ($\Delta b^*$) between the yellowness of the specimen obtained after the third extrusion process and that of the specimen obtained after the first extrusion process was determined using a spectrophotometer (ColorQuest XE produced by HunterLab). Likely, for the specimen of each of the modified polymer compositions prepared in Examples 1-18 and Comparative Examples 1-21, the yellowness difference ($\Delta b^*$) between the yellowness of the specimen obtained after the fifth extrusion process and that of the specimen obtained after the first extrusion process was determined using a spectrophotometer (ColorQuest XE produced by HunterLab). The results are shown in Tables 3 and 4.

2. Melt Index Difference ($\Delta MI$)

For the specimen of each of the modified polymer compositions prepared in Examples 1-18 and Comparative Examples 1-21, the melt index difference ($\Delta MI$) between the melt index of the specimen obtained after the third extrusion process and that of the specimen obtained after the first extrusion process was determined using Laboratory Melt Indexer LMI D4004 produced by Dynisco. Likely, for each of the modified polymer compositions prepared in Examples 1-18 and Comparative Examples 1-21, the melt index difference ($\Delta MI$) of the specimen between the melt index of the specimen obtained after the fifth extrusion process and that of the specimen obtained after the first extrusion process was determined using Laboratory Melt Indexer LMI D4004 produced by Dynisco. The melt index difference is defined as the ratio of the melt index of the specimen obtained after a respective subsequent extrusion process (third or fifth) to the melt index of the specimen obtained after the first extrusion process. The results are shown in Tables 3 and 4.

TABLE 1

Stabilizer Mixture

| | Polymer | | Organic phosphorus-containing antioxidant | | | | | | | | | Sulfur-containing carboxylate salt | | | | |
|---|---|---|---|---|---|---|---|---|---|---|---|---|---|---|---|---|
| Exs. | PP | PE | A1 | A2 | A3 | A4 | A5 | A6 | A7 | A8 | A9 | B1 | B2 | B3 | B4 | B5 |
| 1 | 100 | — | 0.02 | — | — | — | — | — | — | — | — | 0.02 | — | — | — | — |
| 2 | 100 | — | — | 0.02 | — | — | — | — | — | — | — | 0.02 | — | — | — | — |
| 3 | 100 | — | — | — | 0.02 | — | — | — | — | — | — | 0.02 | — | — | — | — |
| 4 | 100 | — | — | — | — | 0.02 | — | — | — | — | — | 0.02 | — | — | — | — |
| 5 | 100 | — | — | — | — | — | 0.02 | — | — | — | — | 0.02 | — | — | — | — |
| 6 | 100 | — | — | — | — | — | — | 0.02 | — | — | — | 0.02 | — | — | — | — |
| 7 | 100 | — | — | — | — | — | — | — | 0.02 | — | — | 0.02 | — | — | — | — |
| 8 | 100 | — | — | — | — | — | — | — | — | 0.02 | — | 0.02 | — | — | — | — |
| 9 | 100 | — | — | — | — | — | — | — | — | — | 0.02 | 0.02 | — | — | — | — |
| 10 | 100 | — | 0.02 | — | — | — | — | — | — | — | — | — | 0.02 | — | — | — |
| 11 | 100 | — | 0.02 | — | — | — | — | — | — | — | — | — | — | 0.02 | — | — |
| 12 | 100 | — | 0.02 | — | — | — | — | — | — | — | — | — | — | — | 0.02 | — |
| 13 | 100 | — | 0.02 | — | — | — | — | — | — | — | — | — | — | — | — | 0.02 |
| 14 | 100 | — | 1 | — | — | — | — | — | — | — | — | 1 | — | — | — | — |
| 15 | 100 | — | 0.01 | — | — | — | — | — | — | — | — | 0.99 | — | — | — | — |
| 16 | 100 | — | 0.99 | — | — | — | — | — | — | — | — | 0.01 | — | — | — | — |
| 17 | — | 100 | 0.02 | — | — | — | — | — | — | — | — | 0.02 | — | — | — | — |
| 18 | — | 100 | — | 0.02 | — | — | — | — | — | — | — | 0.02 | — | — | — | — |

TABLE 2

Stabilizer(s)

| | Polymer | | Organic phosphorus-containing antioxidant | | | | | | | | | Sulfur-containing carboxylate ester | Sulfur-containing carboxylate salt | | | | |
|---|---|---|---|---|---|---|---|---|---|---|---|---|---|---|---|---|---|
| Comp Exs. | PP | PE | A1 | A2 | A3 | A4 | A5 | A6 | A7 | A8 | A9 | DSTDP | B1 | B2 | B3 | B4 | B5 |
| 1 | 100 | — | 0.02 | — | — | — | — | — | — | — | — | — | — | — | — | — | — |
| 2 | 100 | — | — | 0.02 | — | — | — | — | — | — | — | — | — | — | — | — | — |
| 3 | 100 | — | — | — | 0.02 | — | — | — | — | — | — | — | — | — | — | — | — |
| 4 | 100 | — | — | — | — | 0.02 | — | — | — | — | — | — | — | — | — | — | — |
| 5 | 100 | — | — | — | — | — | 0.02 | — | — | — | — | — | — | — | — | — | — |
| 6 | 100 | — | — | — | — | — | — | 0.02 | — | — | — | — | — | — | — | — | — |
| 7 | 100 | — | — | — | — | — | — | — | 0.02 | — | — | — | — | — | — | — | — |
| 8 | 100 | — | — | — | — | — | — | — | — | 0.02 | — | — | — | — | — | — | — |
| 9 | 100 | — | — | — | — | — | — | — | — | — | 0.02 | — | — | — | — | — | — |
| 10 | 100 | — | — | — | — | — | — | — | — | — | — | 0.02 | — | — | — | — | — |
| 11 | 100 | — | 0.02 | — | — | — | — | — | — | — | — | 0.02 | — | — | — | — | — |
| 12 | 100 | — | — | 0.02 | — | — | — | — | — | — | — | 0.02 | — | — | — | — | — |
| 13 | 100 | — | — | — | — | — | — | — | — | — | — | — | 0.02 | — | — | — | — |
| 14 | 100 | — | — | — | — | — | — | — | — | — | — | — | — | 0.02 | — | — | — |
| 15 | 100 | — | — | — | — | — | — | — | — | — | — | — | — | — | 0.02 | — | — |
| 16 | 100 | — | — | — | — | — | — | — | — | — | — | — | — | — | — | 0.02 | — |
| 17 | 100 | — | — | — | — | — | — | — | — | — | — | — | — | — | — | — | 0.02 |
| 18 | — | 100 | 0.02 | — | — | — | — | — | — | — | — | — | — | — | — | — | — |
| 19 | — | 100 | — | 0.02 | — | — | — | — | — | — | — | — | — | — | — | — | — |
| 20 | 100 | — | 1 | — | — | — | — | — | — | — | — | — | — | — | — | — | — |
| 21 | 100 | — | — | — | — | — | — | — | — | — | — | — | 1 | — | — | — | — |

TABLE 3

| | Δb* | | ΔMI | |
|---|---|---|---|---|
| Specimens | 3rd Extrusion | 5th Extrusion | 3rd Extrusion | 5th Extrusion |
| E1 | 2.66 | 5.04 | 161.58% | 258.64% |
| E2 | 2.46 | 4.35 | 148.93% | 235.25% |
| E3 | 1.81 | 3.74 | 112.29% | 182.76% |
| E4 | 1.94 | 3.86 | 153.72% | 240.15% |
| E5 | 2.30 | 4.54 | 113.83% | 189.73% |
| E6 | 2.58 | 4.58 | 153.88% | 249.23% |
| E7 | 2.58 | 4.49 | 151.58% | 257.11% |
| E8 | 2.44 | 4.38 | 147.91% | 237.09% |
| E9 | 2.50 | 4.43 | 150.75% | 240.42% |
| E10 | 2.45 | 4.40 | 150.97% | 239.48% |
| E11 | 2.43 | 4.41 | 131.12% | 222.54% |
| E12 | 2.36 | 4.21 | 132.65% | 201.42% |
| E13 | 2.51 | 4.36 | 125.78% | 225.67% |
| E14 | 1.58 | 3.62 | 106.55% | 180.65% |

TABLE 3-continued

| | Δb* | | ΔMI | |
| --- | --- | --- | --- | --- |
| Specimens | 3rd Extrusion | 5th Extrusion | 3rd Extrusion | 5th Extrusion |
| E15 | 2.31 | 4.08 | 138.87% | 227.86% |
| E16 | 2.36 | 4.32 | 145.48% | 231.17% |
| E17 | 2.88 | 3.95 | 98.31% | 94.62% |
| E18 | 2.17 | 3.82 | 96.06% | 90.15% |

TABLE 4

| | Δb* | | ΔMI | |
| --- | --- | --- | --- | --- |
| Specimens | 3rd Extrusion | 5th Extrusion | 3rd Extrusion | 5th Extrusion |
| CE1 | 4.40 | 7.68 | 183.87% | 377.11% |
| CE2 | 4.70 | 7.72 | 182.62% | 381.96% |
| CE3 | 3.58 | 6.65 | 187.39% | 358.10% |
| CE4 | 3.63 | 6.74 | 186.91% | 365.29% |
| CE5 | 4.54 | 7.72 | 187.41% | 382.88% |
| CE6 | 4.24 | 7.57 | 188.09% | 389.26% |
| CE7 | 4.18 | 7.50 | 185.50% | 384.89% |
| CE8 | 3.78 | 6.74 | 205.33% | 392.88% |
| CE9 | 3.60 | 6.55 | 201.60% | 389.75% |
| CE10 | 3.63 | 6.62 | 202.46% | 382.88% |
| CE11 | 3.82 | 6.60 | 175.79% | 368.26% |
| CE12 | 3.12 | 5.92 | 180.70% | 314.41% |
| CE13 | 3.99 | 6.73 | 178.09% | 374.07% |
| CE14 | 3.28 | 6.12 | 181.80% | 322.84% |
| CE15 | 3.75 | 6.45 | 188.56% | 386.12% |
| CE16 | 3.28 | 6.12 | 177.42% | 333.76% |
| CE17 | 3.28 | 6.12 | 182.91% | 336.21% |
| CE18 | 3.92 | 6.64 | 95.11% | 87.33% |
| CE19 | 3.36 | 6.36 | 91.79% | 78.70% |
| CE20 | 4.99 | 9.89 | 177.94% | 315.65% |
| CE21 | 4.12 | 7.13 | 169.43% | 317.12% |

As shown in Tables 3 and 4, for the specimens E1-E18 prepared from the modified polymer compositions of Examples 1-18, Δb* values of the specimens after the third extrusion process are all smaller than or equal to 2.88, and Δb* values of the specimens after the fifth extrusion process are all smaller than or equal to 5.04. However, for the specimens CE1-CE21 prepared from the modified polymer compositions of Comparative Examples 1-21, Δb* values of the specimens after the third extrusion process are all larger than or equal to 3.12, and Δb*values of the specimens after the fifth extrusion process are all larger than or equal to 5.92. Evidently, the modified polymer compositions of Examples 1-18 (which were prepared using a stabilizer mixture of the disclosure) have improved color stability compared to that of the modified polymer compositions of Comparative Examples 1-21.

Particularly, each of the specimens E1 and E10 prepared from the modified polymer compositions of Examples 1 and 10 (which contain the organic phosphorus-containing antioxidant A1 and one of the sulfur-containing carboxylate salts B1 and B2) has a better color stability compared to the specimen CE11 prepared from the modified polymer composition of Comparative Example 11 (which also contains the organic phosphorus-containing antioxidant A1, but with the sulfur-containing carboxylate ester DSTDP rather than a sulfur-containing carboxylate salt). Therefore, it can be indicated that a sulfur-containing carboxylate salt, when used in combination with an organic phosphorus-containing antioxidant, can synergistically render a modified polymer composition more resistant to coloration compared to a corresponding sulfur-containing carboxylate ester. A similar conclusion can be drawn based on the difference in color stability between the specimen E2 prepared from the modified polymer composition of Example 2 (which contains the organic phosphorus-containing antioxidant A2 and the sulfur-containing carboxylate salt B1) and the specimen CE12 prepared from the modified polymer composition of Comparative Example 12 (which also contains the organic phosphorus-containing antioxidant A2, but with the sulfur-containing carboxylate ester DSTDP rather than a sulfur-containing carboxylate salt).

Considering the processing stability in terms of melt index difference, for the specimens E1-E16 prepared from the modified polymer compositions of Examples 1-16 (which contain PP), ΔMI values of the specimens after the third extrusion process are all smaller than or equal to 161.58%, and ΔMI values of the specimens after the fifth extrusion process are all smaller than or equal to 258.64%. However, for the specimens CE1-CE17 and CE20-CE21 prepared from the modified polymer compositions of Comparative Examples 1-17 and 20-21 (which contain PP), ΔMI values of the specimens after the third extrusion process are all larger than or equal to 175.79%, and ΔMI values of the specimens after the fifth extrusion process are all larger than or equal to 314.41%. Evidently, the modified polymer compositions of Examples 1-16 (which were prepared using a stabilizer mixture of the disclosure) has improved processing stability compared to that of the modified polymer compositions of Comparative Examples 1-17 and 20-21.

Particularly, each of the specimens E1 and E10 prepared from the modified polymer compositions of Examples 1 and 10 (which contain the organic phosphorus-containing antioxidant A1 and one of the sulfur-containing carboxylate salts B1 and B2) has a better processing stability compared to the specimen CE11 prepared from the modified polymer composition of Comparative Example 11 (which also contains the organic phosphorus-containing antioxidant A1, but with the sulfur-containing carboxylate ester DSTDP rather than a sulfur-containing carboxylate salt). Therefore, it can be indicated that a sulfur-containing carboxylate salt, when used in combination with an organic phosphorus-containing antioxidant, can synergistically render a modified polymer composition more resistant to change in melt index compared to a corresponding sulfur-containing carboxylate ester. A similar conclusion can be drawn based on the difference in processing stability between the specimen E2 prepared from the modified polymer composition of Example 2 (which contains the organic phosphorus-containing antioxidant A2 and the sulfur-containing carboxylate salt B1) and the specimen CE12 prepared from the modified polymer composition of Comparative Example 12 (which also contains the organic phosphorus-containing antioxidant A2, but with the sulfur-containing carboxylate ester DSTDP rather than a sulfur-containing carboxylate salt).

Turning to the specimens E17-E18 prepared from the modified polymer compositions of Examples 17-18 (which contain PE) and the specimens CE18-CE19 prepared from the modified polymer compositions of Comparative Examples 18-19 (which contain PE), the processing stability of the modified polymer compositions made from PE is described below in terms of melt index difference. However, it should be noted that in evaluating processing stability, a specimen made from PE and a specimen made from PP are viewed differently due to their difference in properties (such as degree of crosslinking and tendency to crack). To be specific, the MI value of a specimen made from PP normally increases with the number of times which extrusion is conducted (i.e. the greater the number of times which extrusion is conducted, the larger the ΔMI value is), while the MI value of a specimen made from PE normally decreases with the number of times which extrusion is conducted (i.e. the greater the number of times which extrusion is conducted, the smaller the ΔMI value is). Therefore, a specimen made from PP exhibits satisfactory processing stability if its ΔMI value does not drastically increase with the number of times which extrusion is conducted, while a specimen made from PE exhibits satisfactory processing stability if its ΔMI value does not drastically decrease with the number of times which extrusion is conducted.

For the specimens E17-E18 (made from PE), ΔMI values of the specimens after the third extrusion process are both larger than or equal to 96.06%, and ΔMI values of the specimens after the fifth extrusion process are both larger than or equal to 90.15%. However, for the specimens CE18-CE19 (made from PE), ΔMI values of the specimens after the third extrusion process are both smaller than or equal to 95.11%, and ΔMI values of the specimens after the fifth extrusion process are both smaller than or equal to 87.33%. Evidently, the modified polymer compositions of Examples 17-18 (which were prepared using a stabilizer mixture of the disclosure) has improved processing stability compared to that of the modified polymer compositions of Comparative Examples 18-19.

In addition to the aforesaid processing stability provided by the stabilizer mixture of the present disclosure as illustrated by the ΔMI values in Table 3, the MI values of the specimens E1-E18 prepared from the modified polymer compositions of Examples 1-18, which were used to calculate the ΔMI values in Table 3, are shown in Table 5 for further demonstrating the meritorious effect of the stabilizer mixture of the present disclosure.

TABLE 5

| Specimens | MI | | |
|---|---|---|---|
| | 1ᵗʰ Extrusion | 3ʳᵈ Extrusion | 5ᵗʰ Extrusion |
| E1 | 0.2803 | 0.4529 | 0.7250 |
| E2 | 0.2624 | 0.3908 | 0.6173 |
| E3 | 0.2616 | 0.2938 | 0.4781 |
| E4 | 0.2933 | 0.4509 | 0.7044 |
| E5 | 0.3142 | 0.3577 | 0.5961 |
| E6 | 0.3184 | 0.4900 | 0.7935 |
| E7 | 0.3008 | 0.4560 | 0.7734 |
| E8 | 0.2794 | 0.4133 | 0.6624 |
| E9 | 0.3145 | 0.4741 | 0.7561 |
| E10 | 0.2911 | 0.4395 | 0.6971 |
| E11 | 0.3082 | 0.4041 | 0.6859 |
| E12 | 0.3025 | 0.4013 | 0.6093 |
| E13 | 0.2838 | 0.3570 | 0.6405 |
| E14 | 0.2249 | 0.2396 | 0.4063 |
| E15 | 0.3025 | 0.4201 | 0.6893 |
| E16 | 0.2417 | 0.3516 | 0.5587 |
| E17 | 9.157 | 9.002 | 8.664 |
| E18 | 9.158 | 8.797 | 8.256 |

The low MI values of the specimens E1-E16 shown in Table 5 indicate that the stabilizer mixture of the present disclosure can impart a satisfactory physical property to a polymer composition made from PP (i.e. the lower the MI value is, the better the physical property of a polymer composition made from PP is), and the high MI values of the specimens E17-E18 shown in Table 5 indicate that the stabilizer mixture of the present disclosure can also impart a satisfactory physical property to a polymer composition made from PE (i.e. the higher the MI value is, the better the physical property of a polymer composition made from PE is). Moreover, the following comparison between the specimens made from PP can further demonstrate the effect of the stabilizer mixture of the present disclosure on the physical property of a polymer composition. Compared to the specimen CE11 (containing the organic phosphorus-containing antioxidant A1, but with the sulfur-containing carboxylate ester DSTDP rather than a sulfur-containing carboxylate salt), the MI values of which after the first, third, and fifth extrusion processes are 0.3828, 0.6729, and 1.4097, each of the specimens E1 and E10 (which contain the organic phosphorus-containing antioxidant A1 and one of the sulfur-containing carboxylate salts B1 and B2) has a lower MI value after several times of extrusion. Likewise, compared to the specimen CE12 (containing the organic phosphorus-containing antioxidant A2, but with the sulfur-containing carboxylate ester DSTDP rather than a sulfur-containing carboxylate salt), the MI values of which after the first, third, and fifth extrusion processes are 0.3616, 0.6534, and 1.1369, the specimen E2 (which contains the organic phosphorus-containing antioxidant A2 and the sulfur-containing carboxylate salt B1) has a lower MI value after several times of extrusion. Thus, the stabilizer mixture of the present disclosure not only provides processing stability for a polymer composition, but also confers a satisfactory physical property on the polymer composition.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A stabilizer mixture for modifying an olefin-based polymer, the stabilizer mixture comprising:
    at least one organic phosphorus-containing antioxidant represented by a formula selected from the group consisting of formulae (1), (2), (3), (4), (5), (6), (7), and (8):

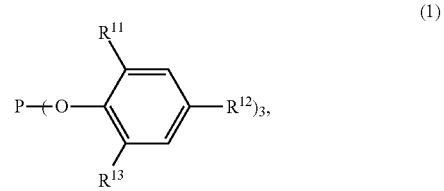

wherein R$^{11}$, R$^{12}$, and R$^{13}$ are independently selected from the group consisting of hydrogen, a tert-butyl group, an isopropylphenyl group, and a linear C$_1$-C$_8$ alkyl group, (2)

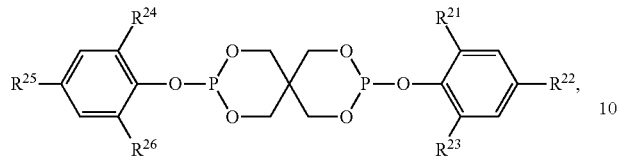

wherein R$^{21}$, R$^{22}$, R$^{23}$, R$^{24}$, R$^{25}$, and R$^{26}$ are independently selected from the group consisting of hydrogen, a tert-butyl group, an isopropylphenyl group, and a linear C$_1$-C$_8$ alkyl group, (3)

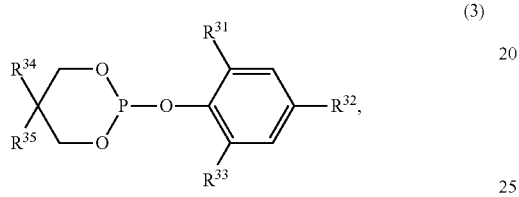

wherein R$^{31}$, R$^{32}$, R$^{33}$, R$^{34}$, and R$^{35}$ are independently selected from the group consisting of hydrogen, a tert-butyl group, an isopropylphenyl group, and a linear C$_1$-C$_8$ alkyl group, (4)

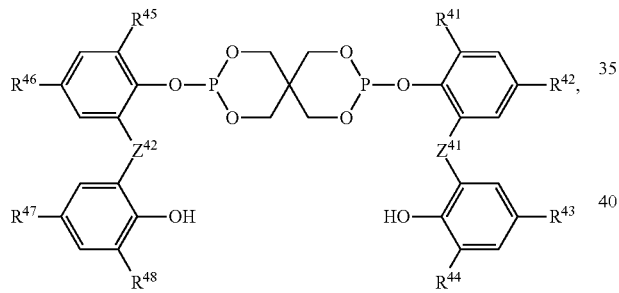

wherein
R$^{41}$, R$^{42}$, R$^{43}$, R$^{44}$, R$^{45}$, R$^{46}$, R$^{47}$, and R$^{48}$ are independently selected from the group consisting of hydrogen, a tert-butyl group, an isopropylphenyl group, and a linear C$_1$-C$_8$ alkyl group, and
Z$^{41}$ and Z$^{42}$ are independently selected from the group consisting of O, S, and a C$_1$-C$_4$ alkylene group, (5)

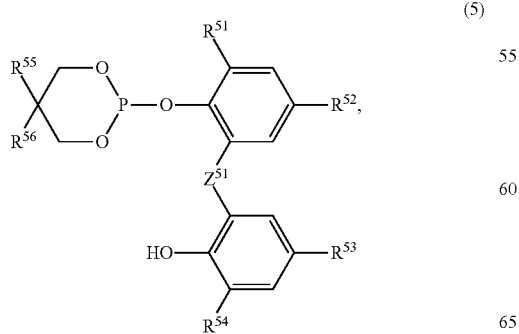

wherein
R$^{51}$, R$^{52}$, R$^{53}$, R$^{54}$, R$^{55}$, and R$^{56}$ are independently selected from the group consisting of hydrogen, a tert-butyl group, an isopropylphenyl group, and a linear C$_1$-C$_8$ alkyl group, and
Z$^{51}$ is selected from the group consisting of O, S, and a C$_1$-C$_4$ alkylene group, (6)

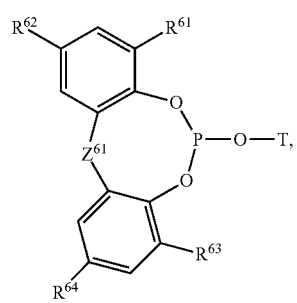

wherein
R$^{61}$, R$^{62}$, R$^{63}$, and R$^{64}$ are independently selected from the group consisting of hydrogen, a tert-butyl group, an isopropylphenyl group, and a linear C$_1$-C$_8$ alkyl group,
T is selected from the group consisting of a C$_1$-C$_{18}$ hydrocarbon group and a group represented by

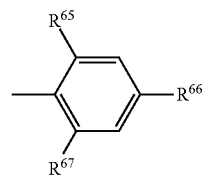

where R$^{65}$, R$^{66}$, and R$^{67}$ are independently selected from the group consisting of hydrogen, a tert-butyl group, an isopropylphenyl group, and a linear C$_1$-C$_8$ alkyl group, and
Z$^{61}$ is selected from the group consisting of O, S, and a C$_1$-C$_4$ alkylene group, (7)

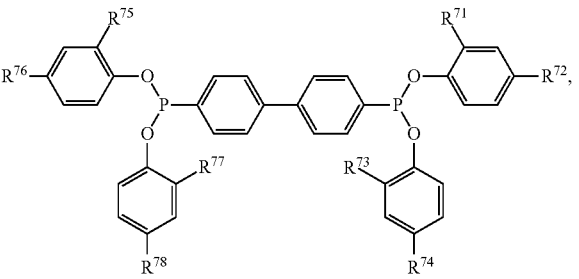

wherein R$^{71}$, R$^{72}$, R$^{73}$, R$^{74}$, R$^{75}$, R$^{76}$, R$^{77}$, and R$^{78}$ are independently selected from the group consisting of hydrogen, a tert-butyl group, an isopropylphenyl group, and a linear C$_1$-C$_8$ alkyl group, and (8)

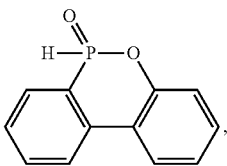

and at least one sulfur-containing carboxylate salt represented by a formula selected from the group consisting of formulae (9), (10), (11), and (12):

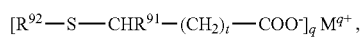
(9)

wherein
$R^{91}$ is selected from the group consisting of hydrogen and a $C_1$-$C_{18}$ alkyl group,
$R^{92}$ is selected from the group consisting of a $C_1$-$C_{30}$ alkyl group and a $C_6$-$C_{18}$ aryl group,
$M^{q+}$ is selected from the group consisting of $Ca^{2+}$, $Ba^{2+}$, $Mg^{2+}$, $Zn^{2+}$, and $Al^{3+}$,
q is an integer of 2 or 3, and
t is an integer ranging from 0 to 6,

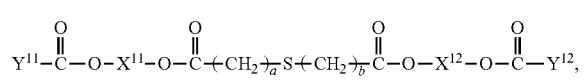
(10)

wherein
$X^{11}$ and $X^{12}$ are independently selected from the group consisting of $Ca^{2+}$, $Ba^{2+}$, $Mg^{2+}$, and $Zn^{2+}$,
$Y^{11}$ and $Y^{12}$ are independently selected from the group consisting of a $C_1$-$C_{30}$ alkyl group and a $C_6$-$C_{18}$ aryl group, and
a and b are independently an integer ranging from 1 to 6,

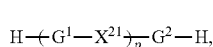
(11)

wherein
$X^{21}$ is selected from the group consisting of $Ca^{2+}$, $Ba^{2+}$, $Mg^{2+}$, and $Zn^{2+}$,
$G^1$ and $G^2$ independently represent

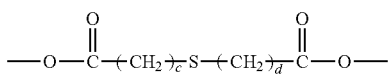

where c and d are independently an integer ranging from 1 to 6, and
p is an integer ranging from 1 to 9 on the proviso that a plurality of $G^1$ are the same or different and a plurality of $X^{21}$ are the same or different when p is an integer equal to or larger than 2, and

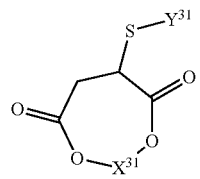
(12)

wherein
$X^{31}$ is selected from the group consisting of $Ca^{2+}$, $Ba^{2+}$, $Mg^{2+}$, and $Zn^{2+}$, and
$Y^{31}$ is selected from the group consisting of a $C_1$-$C_{30}$ alkyl group, a $C_6$-$C_{18}$ aryl group, and a group represented by $R^{93}OOC$—$(CH_2)_k$— where $R^{93}$ is selected from the group consisting of a $C_1$-$C_{30}$ alkyl group and a $C_6$-$C_{18}$ aryl group, and k is an integer ranging from 1 to 5.

2. The stabilizer mixture according to claim 1, wherein $R^{91}$ represents hydrogen and $R^{92}$ is selected from the group consisting of a $C_1$-$C_{18}$ alkyl group and a $C_6$-$C_{18}$ aryl group.

3. The stabilizer mixture according to claim 2, wherein $R^{92}$ is dodecyl.

4. The stabilizer mixture according to claim 1, further comprising an antioxidant selected from the group consisting of a hindered phenolic antioxidant, a benzofuranone-based antioxidant, an amine oxide-based antioxidant, and combinations thereof.

5. The stabilizer mixture according to claim 4, wherein the hindered phenolic antioxidant is selected from the group consisting of pentaerythritol-tetra-[β-(3,5-di-tert-butyl-4-hydroxyphenyl)-propionate], ethylenebis(oxyethylene)bis [β-(3-tert-butyl-4-hydr-oxy-5-methylphenyl)propionate], 1,3,5-trimethyl-2,4,6-tris(3,5-di-tert-butyl-4-hydroxybenzyl)benze-ne, 1 ,3 ,5 -tris(3,5-di-tert-butyl-4-hydroxybenzyl) isocyanurate, tris(butylcresol)butane, 4,4'-butylidenebis (6-tert-butyl-3-methylphenol), N,N'-bis[3-(3,5-di-tert-butyl-4-hydroxyphenyl)propionyl]hydrazide, N,N'-bis-[3-(3,5-di-tert-butyl-4-hydroxyphenyl)propionyl]hexamethylene diamine, 2,2'-methylenebis-(4-methyl-6-tert-butylphenol), octyl-3,5-di-tert-butyl-4-hydroxy-hydrocinnamate, 1,2-di[-(3,5-di-tert-butyl-4-hydroxyphenyl)propionyl-yl]hydrazide, 2,2'-oxamidobis[ethyl-3-(3,5-di-t-butyl-4-hydroxyphenyl) propionate], and combinations thereof.

6. The stabilizer mixture according to claim 4, wherein the benzofuranone-based antioxidant is selected from the group consisting of xylyl dibutylbenzofuranone, 5-(tert-butyl)-3-[5-(tert-butyl)-2-hydroxyphenyl]benzofuran-2(3H)-one, 3-[3,5-bis(1,1-dimethylethyl)-2-hydroxyphenyl]-5,7-bis(1, 1-dimethylethyl)-2(3H)-benzofuranone, and combinations thereof.

7. The stabilizer mixture according to claim 4, wherein the amine oxide-based antioxidant is selected from the group consisting of oxidized bis(hydrogenated tallow alkyl)amine, bis(octadecyl)hydroxylamine, and a combination thereof.

8. The stabilizer mixture according to claim 1, further comprising an additive selected from the group consisting of an antacid agent, a metal deactivating agent, and a combination thereof.

9. The stabilizer mixture according to claim 8, wherein the antacid agent is a fatty acid salt.

10. The stabilizer mixture according to claim 8, wherein the metal deactivating agent is oxalyl-bis(benzylidene)hydrazide.

11. A modified polymer composition, comprising:
an olefin-based polymer selected from the group consisting of polyolefin, ethylene-vinyl acetate copolymer, and a combination thereof; and
a stabilizer mixture containing:
at least one organic phosphorus-containing antioxidant represented by a formula selected from the group consisting of formulae (1), (2), (3), (4), (5), (6), (7), and (8):

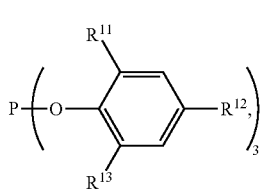
(1)

wherein $R^{11}$, $R^{12}$, and $R^{13}$ are independently selected from the group consisting of hydrogen, a tert-butyl group, an isopropylphenyl group, and a linear $C_1$-$C_8$ alkyl group,

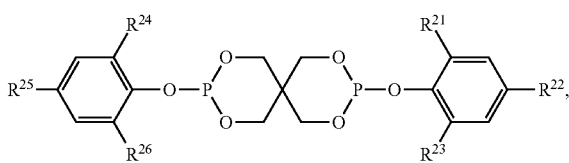
(2)

wherein $R^{21}$, $R^{22}$, $R^{23}$, $R^{24}$, and $R^{25}$ are independently selected from the group consisting of hydrogen, a tert-butyl group, an isopropylphenyl group, and a linear $C_1$-$C_8$ alkyl group,

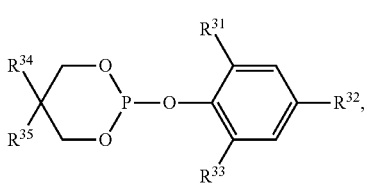
(3)

wherein $R^{31}$, $R^{32}$, $R^{33}$, $R^{34}$, and $R^{35}$ are independently selected from the group consisting of hydrogen, a tert-butyl group, an isopropylphenyl group, and a linear $C_1$-$C_8$ alkyl group,

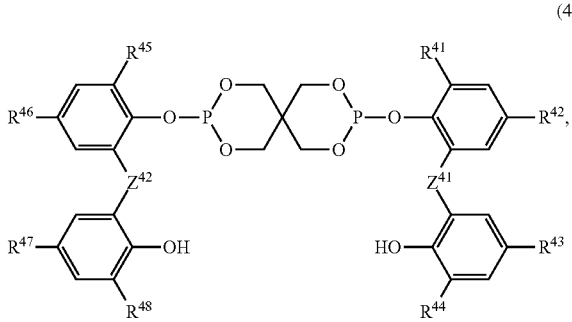
(4)

wherein
$R^{41}$, $R^{42}$, $R^{43}$, $R^{44}$, and $R^{45}$, $R^{46}$, $R^{47}$, and $R^{48}$ are independently selected from the group consisting of hydrogen, a tert-butyl group, an isopropylphenyl group, and a linear $C_1$-$C_8$ alkyl group, and
$Z^{41}$ and $Z^{42}$ are independently selected from the group consisting of O, S, and a $C_1$-$C_4$ alkylene group,

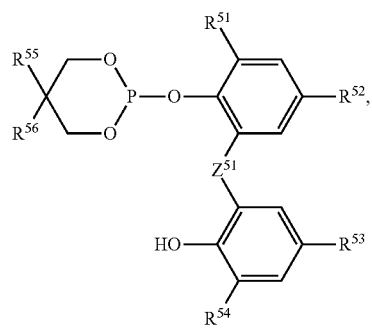
(5)

wherein
$R^{51}$, $R^{52}$, $R^{53}$, $R^{54}$, $R^{55}$, and $R^{56}$ are independently selected from the group consisting of hydrogen, a tert-butyl group, an isopropylphenyl group, and a linear $C_1$-$C_8$ alkyl group, and
$Z^{51}$ is selected from the group consisting of O, S, and a $C_1$-$C_4$ alkylene group,

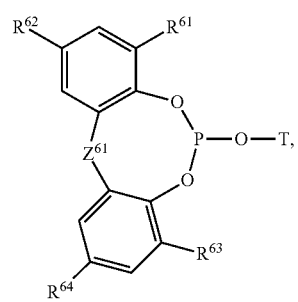
(6)

wherein
$R^{61}$, $R^{62}$, $R^{63}$, and $R^{64}$ are independently selected from the group consisting of hydrogen, a tert-butyl group, an isopropylphenyl group, and a linear $C_1$-$C_8$ alkyl group,
T is selected from the group consisting of a $C_1$-$C_{18}$ hydrocarbon group and a group represented by

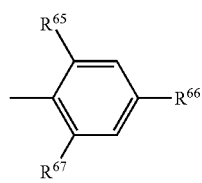

where $R^{65}$, $R^{66}$, and $R^{67}$ are independently selected from the group consisting of hydrogen, a tert-butyl group, an isopropylphenyl group, and a linear $C_1$-$C_8$ alkyl group, and $Z^{61}$ is selected from the group consisting of O, S, and a $C_1$-$C_4$ alkylene group, (7)

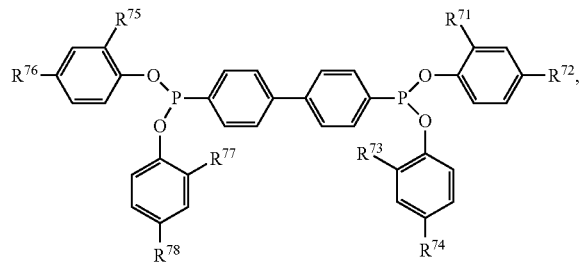

wherein $R^{71}$, $R^{72}$, $R^{73}$, $R^{74}$, $R^{75}$, $R^{76}$, $R^{77}$, and $R^{78}$ are independently selected from the group consisting of hydrogen, a tert-butyl group, an isopropylphenyl group, and a linear $C_1$-$C_8$ alkyl group, and (8)

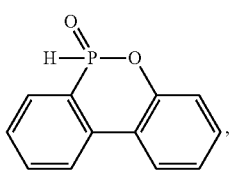

and at least one sulfur-containing carboxylate salt represented by a formula selected from the group consisting of formulae (9), (10), (11), and (12):

(9)

$$\left[ R^{92}-S-CHR^{91}-(CH_2)_t-COO^- \right]_q M^{q+},$$

wherein $R^{91}$ is selected from the group consisting of hydrogen and a $C_1$-$C_{18}$ alkyl group, $R^{92}$ is selected from the group consisting of a $C_1$-$C_{30}$ alkyl group and a $C_6$-$C_{18}$ aryl group, $M^{q+}$ is selected from the group consisting of $Ca^{2+}$, $Ba^{2+}$, $Mg^{2+}$, $Zn^{2+}$, and $Al^{3+}$, q is an integer of 2 or 3, and t is an integer ranging from 0 to 6, (10)

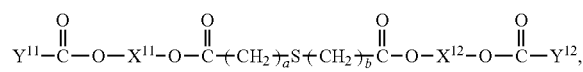

wherein $X^{11}$ and $X^{12}$ are independently selected from the group consisting of $Ca^{2+}$, $Ba^{2+}$, $Mg^{2+}$, and $Zn^{2+}$, $Y^{11}$ and $Y^{12}$ are independently selected from the group consisting of a $C_1$-$C_{30}$ alkyl group and a $C_6$-$C_{18}$ aryl group, and a and b are independently an integer ranging from 1 to 6, (11)

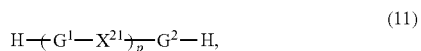

wherein $X_{21}$ is selected from the group consisting of $Ca^{2+}$, $Ba^{2+}$, $Mg^{2+}$, and $Zn^{2+}$, $G^1$ and $G^2$ independently represent

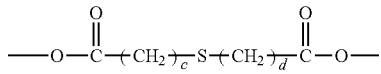

where c and d are independently an integer ranging from 1 to 6, and p is an integer ranging from 1 to 9 on the proviso that a plurality of $G^1$ are the same or different and a plurality of $X^{21}$ are the same or different when p is an integer equal to or larger than 2, and (12)

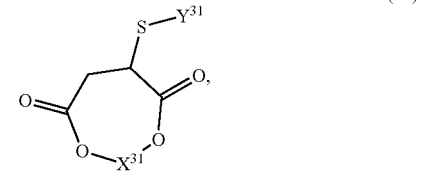

wherein $X^{31}$ is selected from the group consisting of $Ca^{2+}$, $Ba^{2+}$, $Mg^{2+}$, and $Zn^{2+}$, and $Y^{31}$ is selected from the group consisting of a $C_1$-$C_{30}$ alkyl group, a $C_6$-$C_{18}$ aryl group, and a group represented by $R^{93}OOC-(CH_2)_k-$ where $R^{93}$ is selected from the group consisting of a $C_1$-$C_{30}$ alkyl group and a $C_6$-$C_{18}$ aryl group, and k is an integer ranging from 1 to 5.

12. The modified polymer composition according to claim 11, wherein said stabilizer mixture is present in an amount ranging from 0.01 to 2.2 parts by weight based on 100 parts by weight of said olefin-based polymer.

13. The modified polymer composition according to claim 11, wherein said polyolefin is selected from the group consisting of polyethylene, polypropylene, and a combination thereof.

14. The stabilizer mixture according to claim 1, wherein:
when the at least one organic phosphorus-containing antioxidant is represented by a formula selected from the group consisting of formulae (2), (3), (4), (5), (6), (7), and (8), the at least one sulfur-containing carboxylate salt is represented by a formula selected from the group consisting of formulae (9), (10), (11), and (12); and when the at least one organic phosphorus-containing antioxidant is represented by a formula (1), the at least one sulfur-containing carboxylate salt is represented by a formula selected from the group consisting of formulae (10) and (12).

15. The stabilizer mixture according to claim 14, wherein $R^{91}$ represents hydrogen, and $R^{92}$ is selected from the group consisting of a $C_1$-$C_{18}$ alkyl group and a $C_6$-$C_{18}$ aryl group.

16. The stabilizer mixture according to claim 15, wherein $R^{92}$ is dodecyl.

17. The modified polymer composition according to claim 11, wherein:
  when the at least one organic phosphorus-containing antioxidant is represented by a formula selected from the group consisting of formulae (2), (3), (4), (5), (6), (7), and (8), the at least one sulfur-containing carboxylate salt is represented by a formula selected from the group consisting of formulae (9), (10), (11), and (12); and
  when the at least one organic phosphorus-containing antioxidant is represented by a formula (1), the at least one sulfur-containing carboxylate salt is represented by a formula selected from the group consisting of formulae (9), (10), and (12).

18. The modified polymer composition according to claim 17, wherein said stabilizer mixture is present in an amount ranging from 0.01 to 2.2 parts by weight based on 100 parts by weight of said olefin-based polymer.

19. The modified polymer composition according to claim 17, wherein said polyolefin is selected from the group consisting of polyethylene, polypropylene, and a combination thereof.

* * * * *